United States Patent [19]

Bush et al.

[11] 3,977,735

[45] Aug. 31, 1976

[54] VEHICLE BRAKE PROPORTIONING MECHANISM

[75] Inventors: John W. Bush, New Baltimore; Michael J. Denholm, Owosso, both of Mich.

[73] Assignee: Borg-Warner Corporation, Chicago, Ill.

[22] Filed: Mar. 3, 1975

[21] Appl. No.: 554,882

Related U.S. Application Data

[63] Continuation-in-part of Ser. No. 414,569, Nov. 9, 1973, abandoned.

[52] U.S. Cl. ................................ 303/22 R; 188/195

[51] Int. Cl.[2] ............................................ B60T 8/22

[58] Field of Search............. 188/195, 345; 303/6 C, 303/6 R, 22 A, 22 R

[56] References Cited

UNITED STATES PATENTS

| | | | |
|---|---|---|---|
| 2,918,148 | 12/1959 | Uhlenhaut et al. | 188/345 |
| 3,442,557 | 5/1969 | Oberthur | 303/22 R |
| 3,773,367 | 11/1973 | Osborne et al. | 303/22 R |

*Primary Examiner*—Duane A. Reger
*Attorney, Agent, or Firm*—James A. Geppert

[57] ABSTRACT

A valve mechanism for proportioning the braking effect between the front and rear wheels of a vehicle in relation to the load carried; the valve mechanism comprising a plurality of proportioning valves which are controlled by an actuator operatively connected to the vehicle rear axle assembly, the valves being connected to the front and/or rear chambers of the master cylinder and having one of these chambers connected to the front wheel brakes.

23 Claims, 17 Drawing Figures

VEHICLE BRAKE PROPORTIONING MECHANISM

CROSS-REFERENCES TO RELATED APPLICATIONS

This application is a continuation-in-part of application Ser. No. 414,569, filed Nov. 9, 1973, now abandoned.

DISCUSSION OF THE PRIOR ART

In vehicles, particularly of the truck type, it has become necessary to provide means for proportioning the braking effect on the front and rear wheels and especially in heavy duty equipment wherein great disparity occurs in the loads carried by the front and rear wheels of the truck. It is incumbent to provide a system which discriminates between a loaded and unloaded truck and one which is responsive to various load increments and to in essence proportion the braking effect between the front and rear wheels in accordance with actual load conditions. In other words, if the truck is unloaded it is essential that excessive braking of the rear wheels should not occur, not only to equalize tire wear, but also to provide adequate braking for the vehicular unit. The braking mechanism normally of a heavy duty truck is constructed to provide many times more braking effect in the rear wheels than in the front and unless some means is provided it will become apparent that under such circumstances the braking would be effected primarily by the rear wheels which could be hazardous, inasmuch as the wheel to road braking areas then would be concentrated at the wheels which are being more severely braked.

Proportioning devices such as in U.S. Pat. No. 3,450,443 are known. They, however, are isolated from each other and operate reactively. They are not regulated by a common signalling device which senses the weight upon the rear wheels and through an equalizing system sets the several proportioning valves to obtain substantially equal braking effects on both sides of the vehicle.

SUMMARY OF THE INVENTION

This invention is directed to a novel system for proportioning braking forces of the front and rear wheels of a vehicle, the system incorporating in a single housing a pair of proportioning valves having pistons operated through an equalizer bar by a linkage system between the bar and the rear axle to respond to changes in the relationship between the frame and the axle dùe to load change.

The invention also encompasses the provision of independent linkages, one from one side of the axle to its respective piston of a proportioning valve and the other from the other side of the axle to its piston so that with an unbalanced load, the wheel carrying the heavier load would do more of the braking.

A specific object of the invention is to provide in the novel braking system an equalizing valve having a single housing with two valve bores, each having a piston therein and an equalizing bar which straddles the pistons and is operated by an actuating spring rod which is connected to the rear axle.

The invention comprehends various arrangements of the dual proportioning valves with the front and rear wheel brake means, wherein the front and rear sections of the master cylinder are connected through one of the proportioning valves to certain rear wheel cylinders and/or the front wheel cylinders or one section is connected to the front wheel cylinders and the other section has connections through the two proportioning valves to the rear wheels at opposite sides of the vehicle.

Another object is to provide a novel fail safe braking arrangement utilizing dual proportioning valves, wherein both valves serve to transmit braking effort to all of the rear wheels so that even if one valve should fail, a braking effect will still be available.

A further object of the invention is the provision of a novel braking system utilizing dual proportioning valves within a single housing, with the piston of each valve being actuated by an independently mounted actuating spring rod connected to the rear axle of the vehicle. The pair of actuating rods are connected by separate suitable linkages to the opposite ends of the rear axle to proportion the rear braking effort for an unbalanced loading of the vehicle. These and other objects and advantages of the invention will become more readily apparent from the specification and the drawings.

DESCRIPTION OF THE PREFERRED EMBODIMENTS

Figure 4:
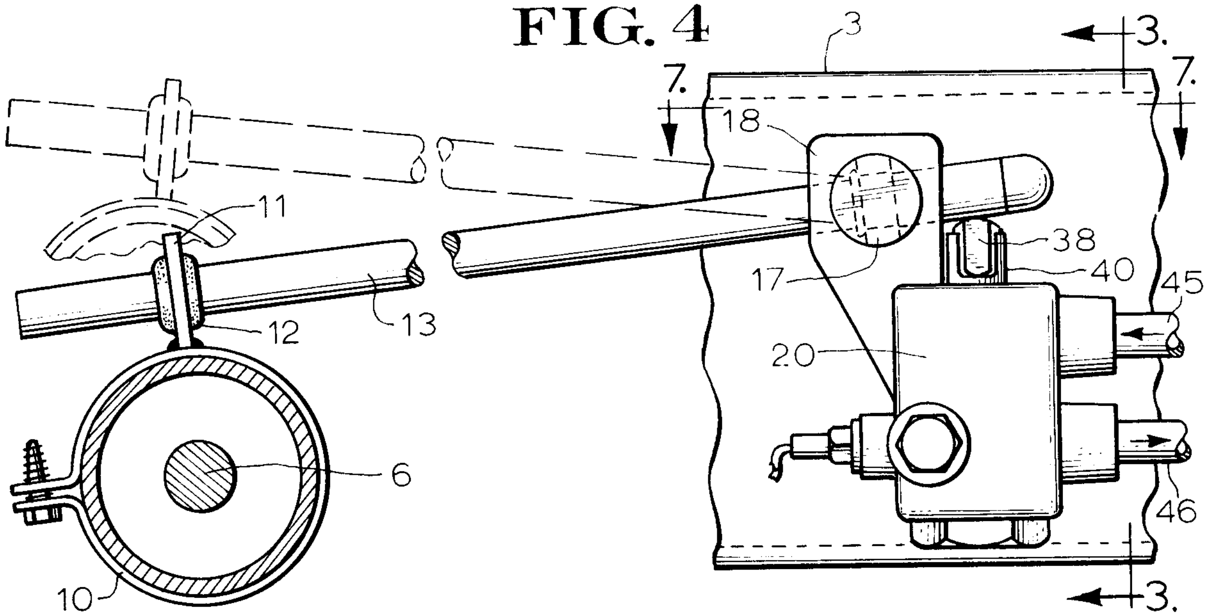
FIG. 4 is a side elevational view of the valve and actuating assembly.
Figure 3:
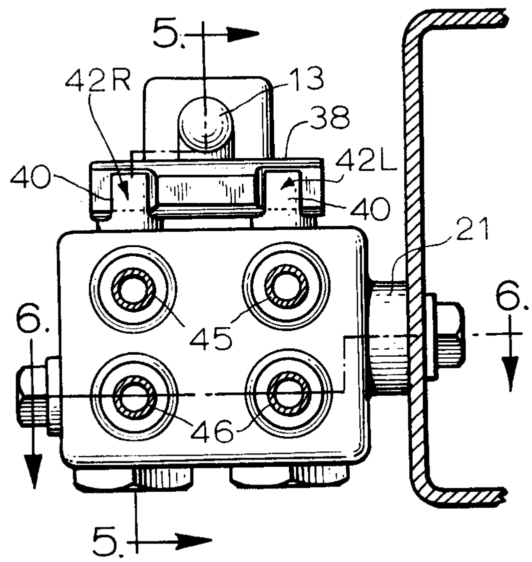
FIG. 3 is a front view of the dual proportioning valve mechanism taken substantially on line 3—3 of FIG. 4.
Figure 7:
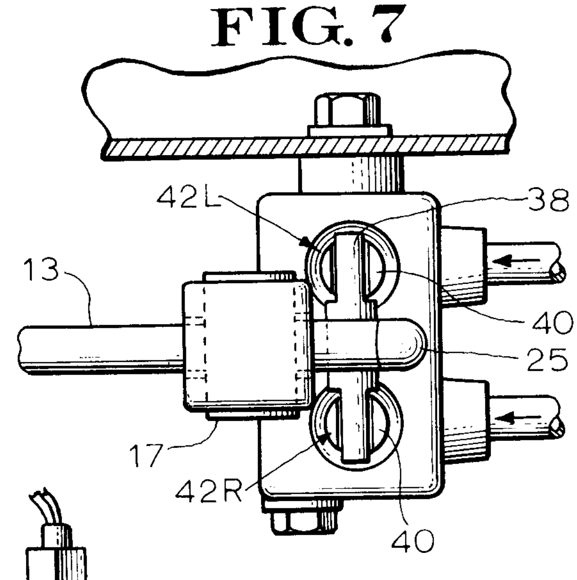
FIG. 7 is a vertical top view taken substantially on line 7—7 of FIG. 4.

Having particular reference to the drawings, there is shown a vehicle 2 having a chassis or frame 3 supported at its front end by front wheels 4 and at its rear end on rear wheels 5 mounted on an axle 6 which is mounted by springs 7 to the frame 3. Dual positions of the rear axle are shown in FIG. 4 with reference to the frame. In the loaded condition of the vehicle the springs are deflected and the frame is lowered to the axle. In the unloaded condition the frame is elevated. A rebounded position is not shown where the vehicle chassis rebounds upwardly and becomes unweighted.

In one embodiment of the invention, the rear axle housing is clamped by a grommet carrier 10 which has a lug 11 mounting a grommet 12 of elastomer material, said grommet admitting the rear end of a spring bar actuating rod 13 therethrough. It will be understood that various types of fastenings for the rear end of the rod are contemplated including bending the rod and connecting it to the rear axle so as to impose a torsional stress in lieu of or in addition to a bending load on the spring rod so as to increase its longevity.

The forward end portion 15 of the rod projects through an opening 16 in a pivot pin 17 which is pivoted on a horizontal axis in an aperture 17 in an upstanding ear 18 formed on the proportioning valve housing or body 20.

The housing 20 may be suitably provided with ears or lugs 21, 21 by which it is secured to the vehicle frame 3. The forward end portion of the rod or load sensing spring 13 projects through an enlarged fore and aft extending aperture 24 in the ear 18, the aperture 24 aligning with the aperture 17 .

The rod is secured to the pivot pin by a U-shaped locking clip generally designated 25 which comprises a bight 25 joining a pair of legs 26, 27 embracing the forward end portion 15 of the rod therebetween. One leg 26 of the spring clip 25 is provided with an inwardly directed tang 28 which enters into a peripheral groove 29 in the rod end portion 15. The legs have outwardly directed flanges 30, 31 respectively which fit into a recess 32 in the back side of the pivot pin and engage the same, and the legs have outwardly directed tangs 34, 35 which fit into a recess 36 in the front side of the pin and engage the forward side thereof. The flanges and tangs 34, 35 lock the spring clip to the pivot pin and the tang 28 locks and locking spring clip to the actuating rod.

Figure 5:
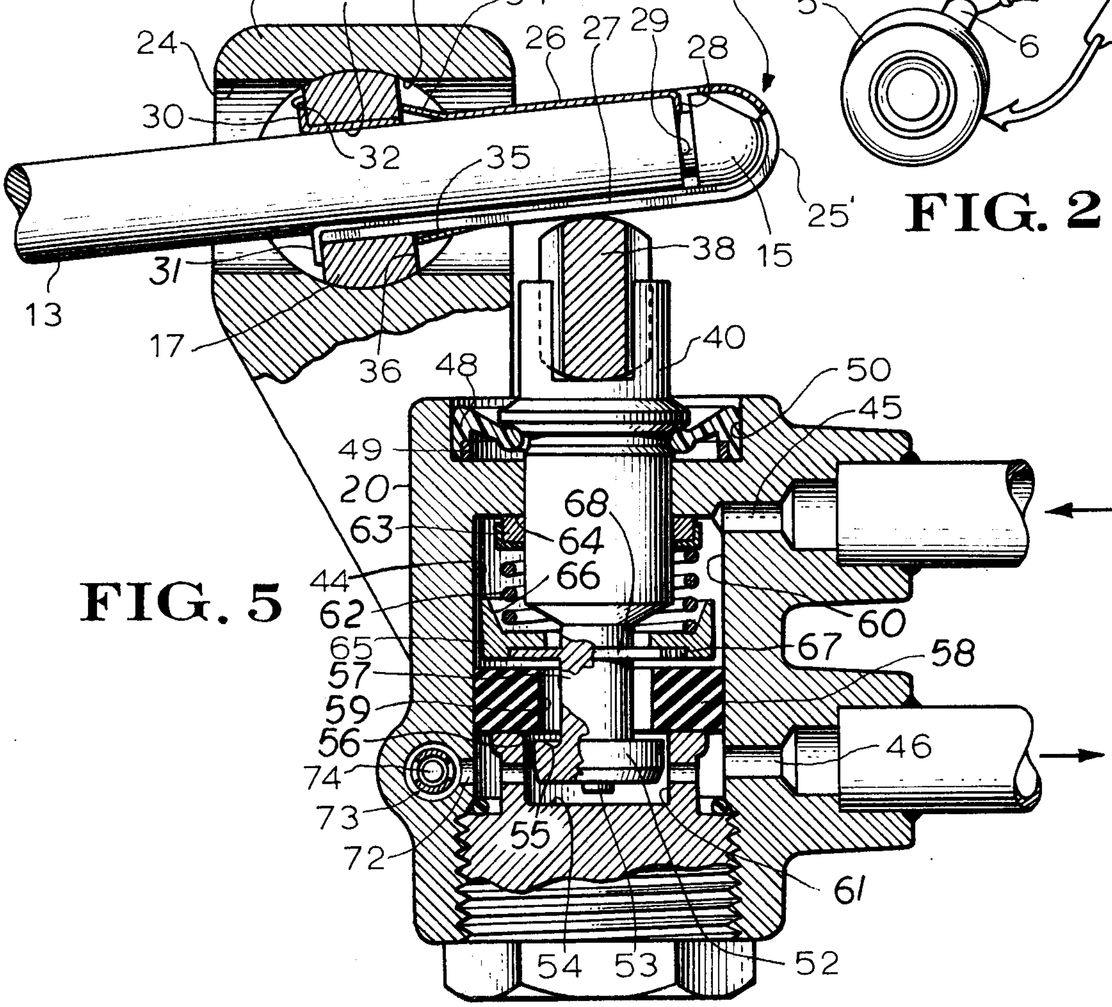
FIG. 5 is an enlarged vertical sectional view of the valve assembly taken substantially on line 5—5 of FIG. 3.

The rod portion 15 overlies the center portion of an equalizing bar 38 as best seen in FIG. 5. The bar 38 spans and straddles a pair of pistons 40, 40 of identical proportioning valves generally designated 42R, 42L. The pistons 40, 40 are reciprocal in the respective side by side bores 44, 44 in the valve housing. An inlet port 45 communicates with one end of each bore and an outlet port 46 is provided at the opposite end of the bore. Each piston is circumscribed at its outer end portion by an external seal 48 of elastomer material which has a metal-reinforced outer rim 49 press-fitted into a counterbore 50 in the housing.

The piston has an enlarged head 52 at its inner end. The head 52 is provided with an abutment projection 53, which serves as a stop and engages the closes end surface 54 of the bore under certain conditions to be described, and an annular recess 55 is formed on the opposite surface of the head providing an annular peripheral lip 56. The piston has an intermediate reduced portion 57 which extends through a center opening 59 in a resilient sealing ring 58 which is disposed in the bore 44 intermediate its ends subdividing the same into inlet and outlet chambers 60, 61. The piston is biased toward the closed end by a spring 62 which is seated at one end against a sealing element 63 about the piston. The element 63 bears against a shoulder 64 at the end of the bore 44 opposite its closed end. The other end of the spring 62 is seated within a recess 66 in a spring seat or collar 65 to bias the collar against a radial flange 67 integral with the piston 40 at the reduced portion 57. The flange 67 has opposite flatted sides 68 to allow fluid pressure communication from the inlet chamber

60 through the spring seat 65 and around the flange 67 to the center opening 59 in the ring.

Figure 6:
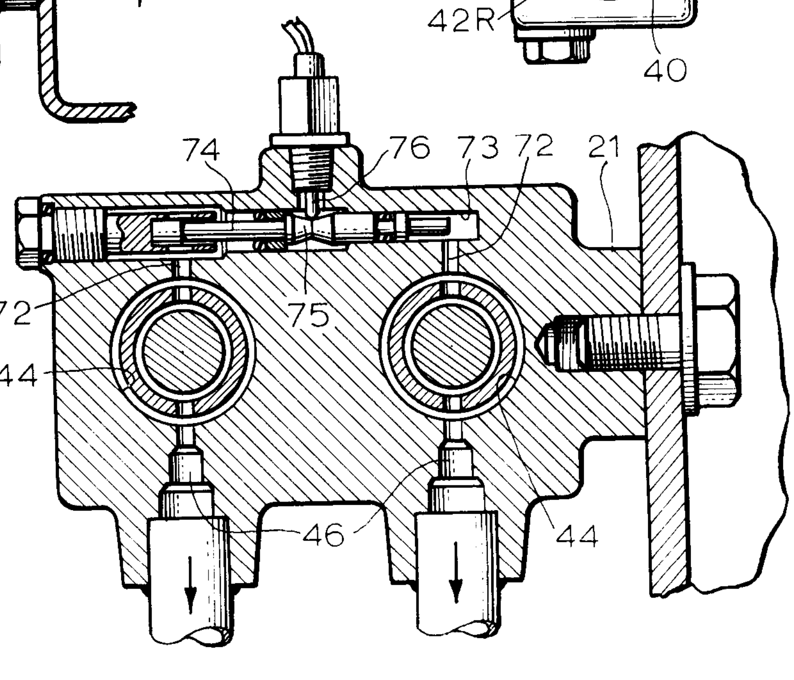
FIG. 6 is a horizontal sectional view taken substantially on line 6—6 of FIG. 3.

The inlet port is connected to the master cylinder 70 and the outlet port to one or more wheel cylinders. The specific connections will be described in relation to FIGS. 8–12. It will also be observed that the outlet chambers of respective valves are connected through ports 72, 72 to opposite ends of a valve bore 73 in which a piston 74 is shuttled. The piston 74 normally is centered as shown in FIG. 6. The piston 74 has a center groove 75 with wedge faces at opposite sides flanking a nib or arm of an electric signal switch 76, which is secured to the valve housing. As long as equal pressure is maintained in each proportioning valve and thus at opposite ends of the piston 74, the piston 74 remains stationary. If the pressure at either end of piston 74 drops, the piston is shifted lengthwise, thus wedging the switch nib outwardly and closing the switch which is suitably connected to an indicator on the dashboard or other location in the vehicle cab to signal the operator of the malfunction.

As heretofore stated, one end of the actuating bar linkage is attached to the rear axle of the van or truck and the other end is operatively connected to the proportioning dynamic load-sensing valves which are connected via the housing to the vehicle body. The rod deflects in relation to the load applied and transmits this loading effect to the valves.

In a fully laden vehicle, the valves internal springs 62 plus the external load applied through the operating bar 13 and equalizer 38 move the pistons 40 inwardy and the heads 52 thereof away from the respective sealing rings 58. The rear wheels thus receive full hydraulic pressure from the master cylinder.

As the pressure increases, valve outlet (rear-wheel cylinder) pressure is equal to valve inlet (master cylinder) pressure, until the split point is reached. Above this point, proportioning occurs. That is, at the split point, outlet pressure on the respective piston head overcomes the internal spring load and the external spring load and moves the respective piston head 52 against its sealing ring 58 sealing off the inlet from the outlet. As the pressure increases above the split point, the piston heads 52 move away from the respective sealing rings and fluid is bled to the outlet. Then outlet pressure builds up and again forces the piston heads to seal off the outlet from the inlet. Release of the brakes causes the inlet pressure to drop, separating the sealing rings from the respective piston heads and dumping outlet pressure.

When the vehicle is unladen, the split point and proportioning occurs at a lower pressure, inasmuch as the external spring load is reduced.

In FIGS. 8–12 various arrangements for interconnecting the proportioning valves with the front and rear wheels and master cylinder are shown.

Figure 8:
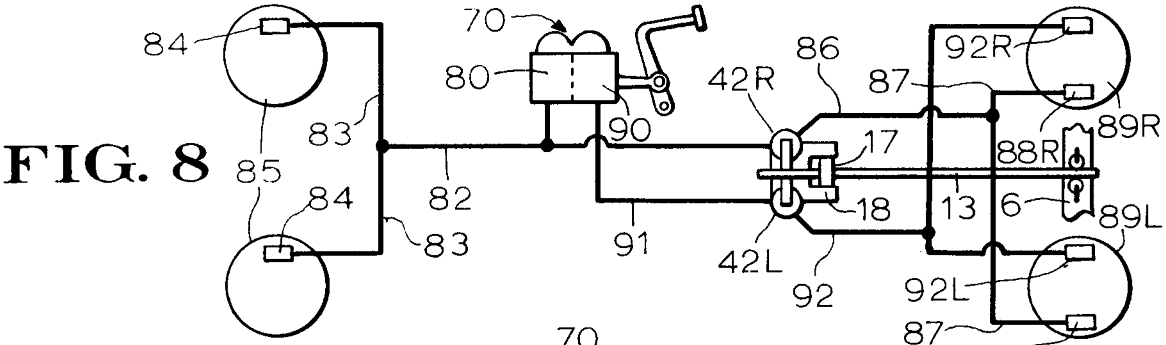
FIGS. 8 through 12 diagrammatically illustrate different hookup arrangements of the valves in the braking systems.

In FIG. 8, the front chamber 80 of the master cylinder 70 is connected through line 82 and branch lines 83, 83 to the wheel cylinders 84, 84 of the front wheel brake assemblies 85, 85. Line 82 also is connected to the inlet port of the proportioning valve 42R and the outlet port of this proportioning valve 42R is connected through line 86 to branch lines 87, 87, which in turn are connected to the wheel cylinders 88L and 88R of the rear wheel brake assemblies 89L and 89R. The rear chamber 90 of the master cylinder is connected by line 91 to the inlet port of proportioning valve 42L which has its outlet port connected to line 92 which has branch lines connected to wheel cylinders 92L and 92R of the rear wheel brake assemblies 89L and 89R. This arrangement provides a fail-safe system since malfunctioning of either proportioning valve will not entirely incapacitate the braking system.

Figure 9:
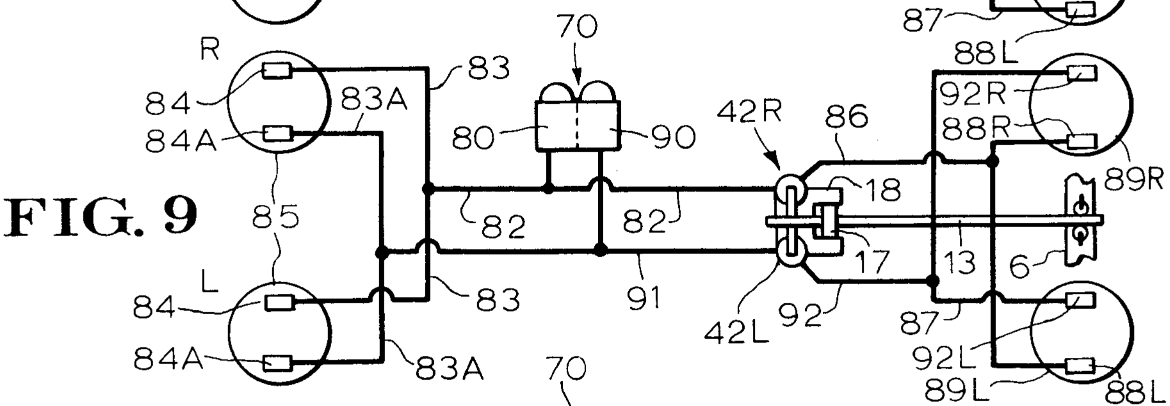

In FIG. 9 the arrangement is the same as in FIG. 8 with addition of lower brake cylinder 84A connected to line 91 by line 83A and the rear chamber of the master cylinder.

Figure 10:
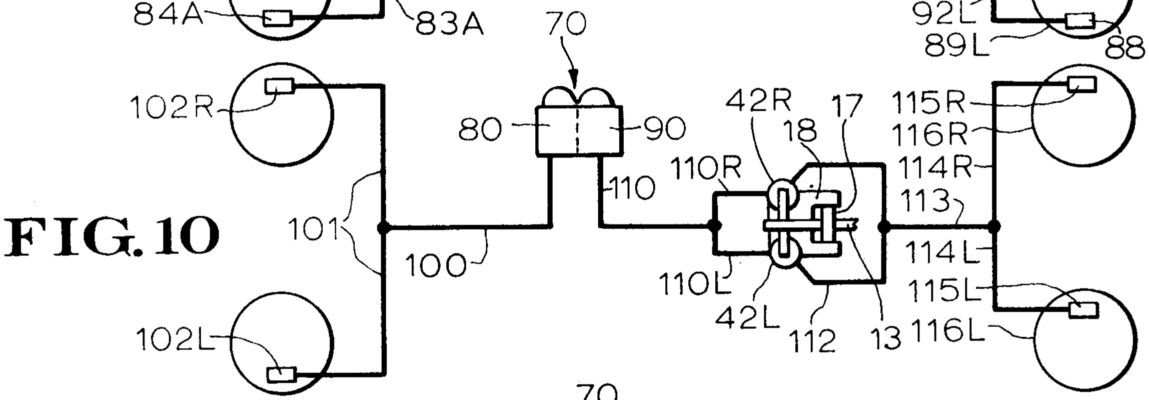

In FIG. 10 the front chamber of the master cylinder is connected by a line 100 to branch lines 101 which are connected to front wheel cylinders 102R and 102L. The rear chamber of the master cylinder is connected by a line 110 to branch lines 110R and 110L which are connected to the inlet ports of the proportioning valves 42R and 42L, respectively, and the outlets of these valves are interconnected by line 112 which in turn is connected to line 113 which is connected to branch lines 114R and 114L of the single cylinders 115R and 115L of the rear wheel brake assemblies 116R and 116L.

Figure 11:
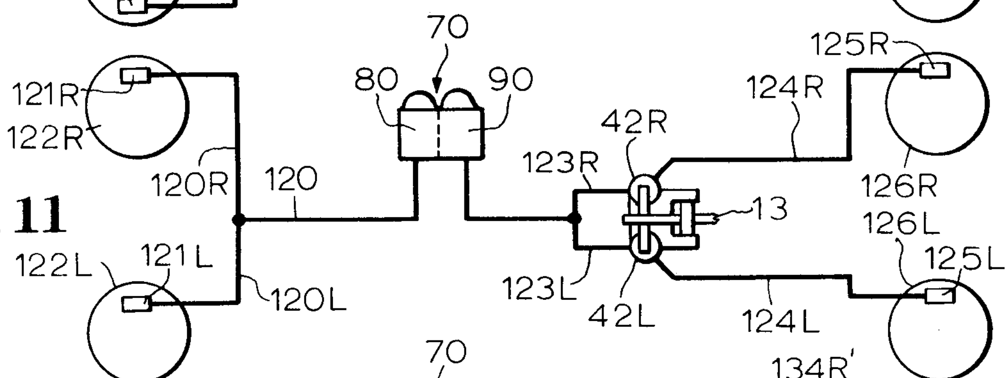

FIG. 11 shows a modification wherein the front chamber of the master cylinder is connected by a line 120 R, to branch lines 120L and 1120R, which are connected to single wheel cylinders 121 L and 121R of the front wheel brakes 122L and 122R. Chamber 90 is connected by branch lines 123R and 123L to the inlets of the proportioning valves 42R and 42L, and the outlets of these valves are connected by lines 124R and 124L to the single wheel cylinders 125R and 125L of rear wheel brakes 126R and 126L.

Figure 12:
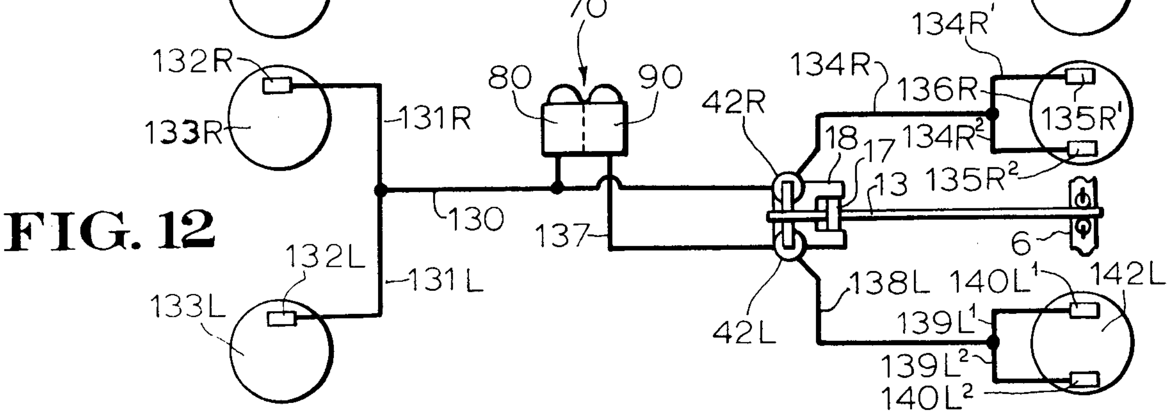

In FIG. 12 the front chamber of the master cylinder is connected by a line 130 to branch lines 131L and 131R, which are connected to front wheel cylinders 132L and 132R of the front wheel brakes 133L and 133R and also to the inlet of the proportioning valve 42R. The outlet of valve 42R is connected by a line 134R to the branch lines $134R^1$ and $134R^2$ which connect with wheel cylinders $135R^1$ and $135R^2$ respectively of rear wheel brake assembly 136R.

The rear master chamber is connected by line 137 to the inlet of valve 42L which has its outlet connected by line 138L to branch lines $139L^1$ and $139L^2$ which are connected to rear wheel cylinders $140L^1$ and $140L^2$ respectively of the rear wheel brake assembly 142L.

It will become readily apparent that the various arrangements embody the concept wherein plural proportioning valves are utilized to provide a novel balanced braking system which is governed by a load sensing linkage.

Figure 1:
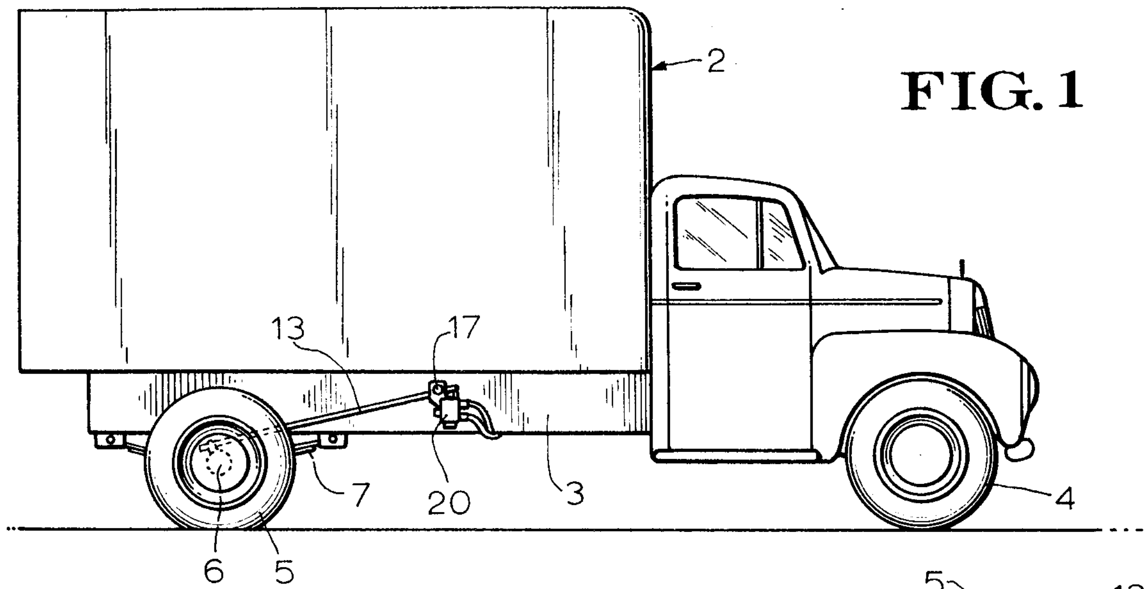
FIG. 1 illustrates the application of the invention to a motor vehicle.
Figure 2:
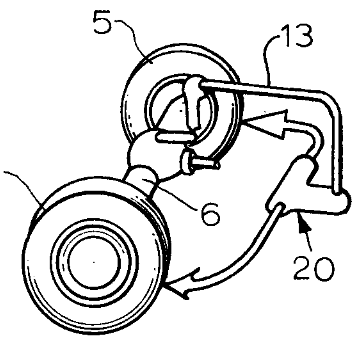
FIG. 2 graphically illustrates the mechanism disassociated from the vehicle.
Figure 13:
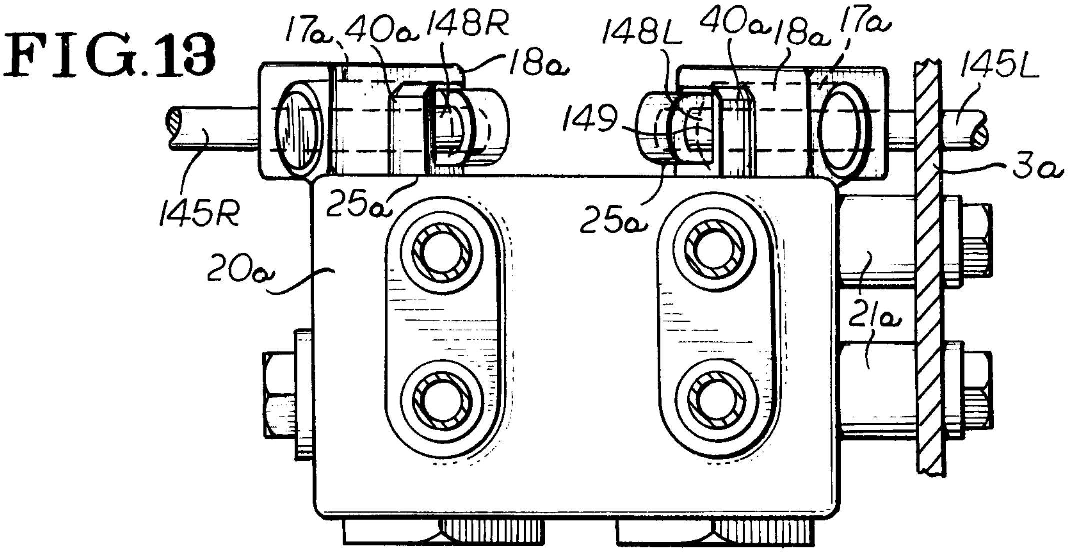
FIG. 13 is a front view of an alternate embodiment of dual proportioning valve mechanism taken on line 13—13 of FIG. 14.
Figure 14:
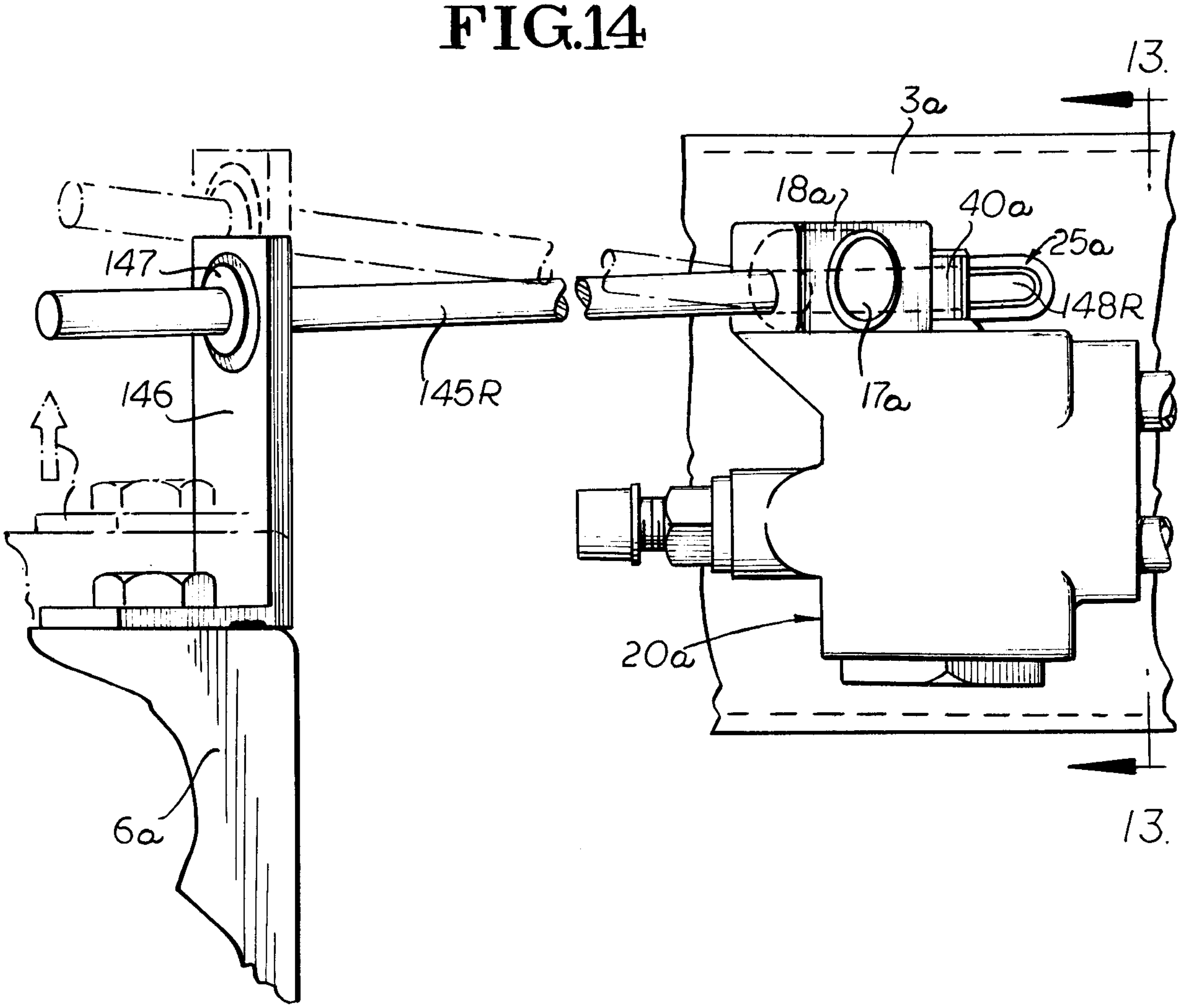
FIG. 14 is a partial side elevational view of the valve mechanism of FIG. 13.
Figure 15:
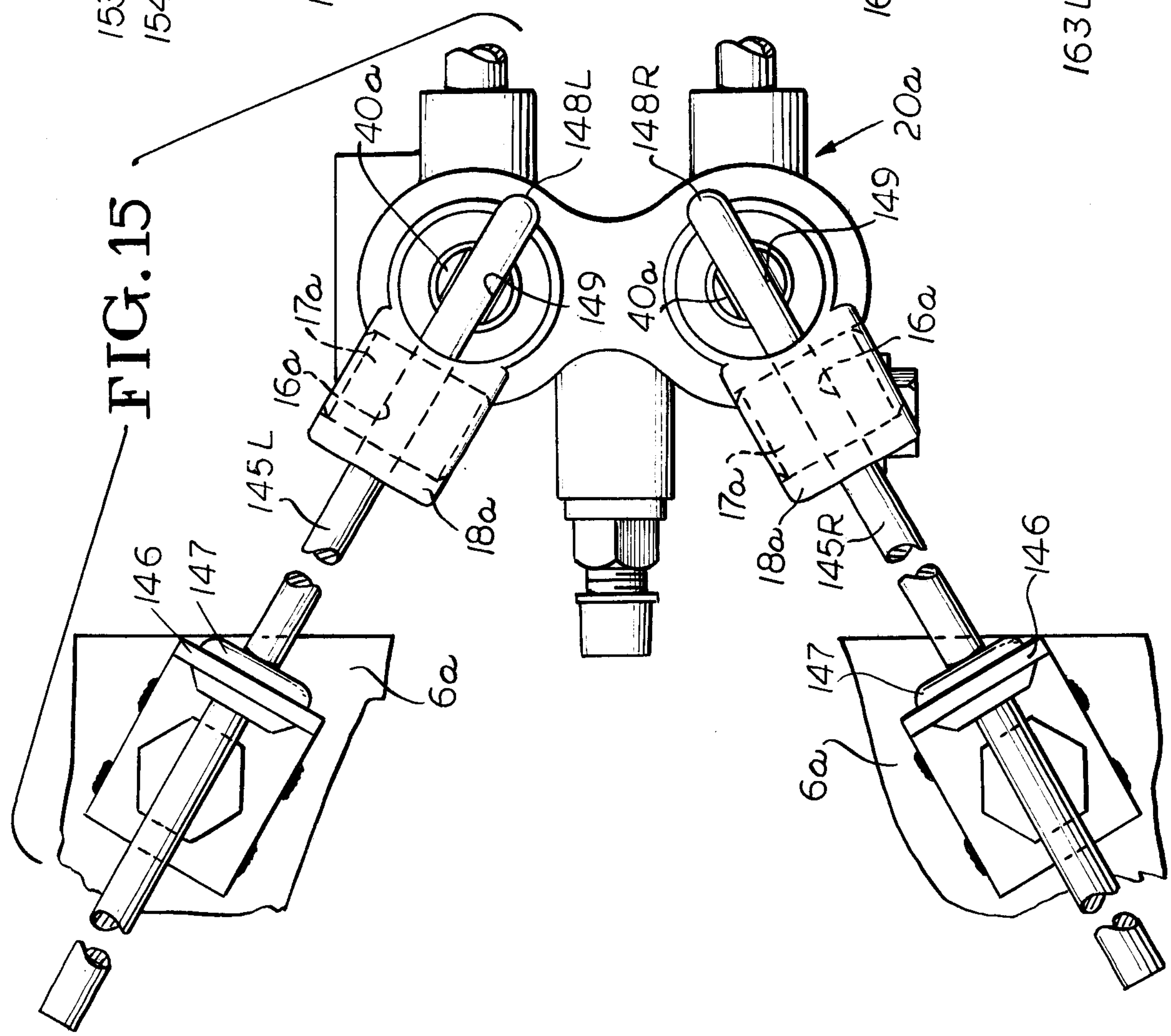
FIG. 15 is a top plan view of the valve and actuating assembly.

FIGS. 13 through 15 disclose another embodiment of valve mechanism similar to that shown in FIGS. 1 through 7, with idential parts carrying the same reference numeral with a script A. The vehicle is substantially the same as shown in FIG. 1, with a rear axle 6*a* and a proportioning valve housing 20*a*having ears or lugs 21*a* to secure it to the vehicle frame 3*a*. Rather than the single spring bar actuating rod of FIG. 1, this embodiment utilizes a pair of angularly oriented actuating rods 145R, 145L with the rods being connected to the opposite ends of the rear axle 6*a* by means of brackets 146, 146 suitably secured to the axle and each bracket mounting a resilient grommet 147 to receive the rear end of the rod 145R or 145L. The rod extend angularly inwardly from the axle ends to terminate in converging forward ends 148R, 148L connected to the valve structure.

The valve housing 20*a* includes a pair of angularly oriented spaced ears 18*a*, 18*a* angularly aligned with the valve stems 40*a* , 40*a*, with each ear having an aperture for reception of a pivot pin 17*a*. Each pivot pin has an opening 16*a* through which the forward end 148R or 148L of a rod 145R or 145L projects. Each rod is secured to its respective pivot pin by a U-shaped locking clip 25*a* substantially identical to the locking clip 25 shown in FIG. 5. Although the use of the locking clip 25 or 25*a* is the preferred manner of interlocking the rod and pivot pin together, it is contemplated that the rod could be permanently secured to the pivot pin, as by welding the parts together. Also, the ear 18 or 18*a* could be formed in two halves to allow insertion of the integral rod and pin into the bearing aperture, and the halves are then clamped or otherwise fastened together.

Each piston 40*a* received in a bore in the valve housing may have a diametrically extending slot 149 opening upward at the upper end of the piston to receive the forward rod end 148R or 148L and its associated locking clip 25*a*, as seen in FIGS. 13 and 15. Alternatively, the piston 40*a* may have a crowned upper end surface with the rod end 148R or 148L bearing on this surface. Each piston 40*a* is reciprocable in its associated bore and has the same configuration as described for the embodiment shown in FIG. 5. The inlet part of each valve is connected to the master cylinder 70*a* and the outlet part is connected to the wheel cylinder of the respective side of the vehicle. Also, the outlet chambers of the respective valves are connected to a valve bore housing a piston which operates in an idential manner to the piston 74 shown in FIG. 6.

As previously stated, one end of each actuating rod is connected to an end of the vehicle axle and the opposite rod end is operatively connected to a valve 40*a* to provide two independent load-sensing valves. Each rod deflects in relation to the load applied and transmits this loading effect to its associated valve. If the loading for the vehicle is equally distributed over the rear axle, the rods and valves will operate in the manner previously described. However, where there is an unbalanced load, the side carrying the heavier load will cause a greater deflection of the rod connected to the end of the axle supporting the heavier load, which will in turn cause greater movement of its associated valve 40*a*, and the wheel cylinder of the rear wheel supporting the heavier load will provide a greater braking action.

The proportioning action of the two valves is substantially the same except that the valve for the vehicle side supporting the heavier load of an unbalanced vehicle loading may reach the split point faster and will provide more fluid bleeding during proportioning to effect a greater braking action than the valve associated with the lighter loading on the other side of the vehicle. Also, the signalling switch will operate for an unbalanced load when the difference exceeds a predetermined minimum valve to signal the operator that an undesirable imbalance of the load for the vehicle has occurred.

Figure 16:
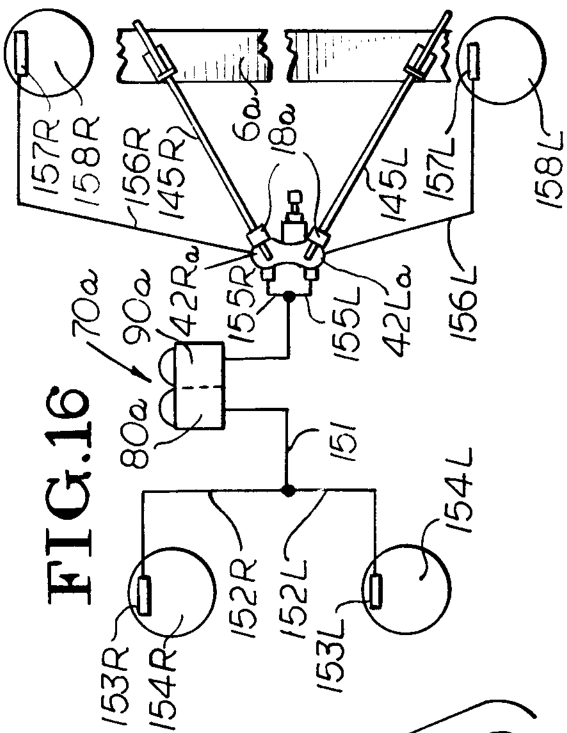
FIGS. 16 and 17 are diagrammatic views of different hookup arrangements similar to FIGS. 11 and 12 but utilizing the valve and actuating assembly of FIGS. 13 through 15.
Figure 17:
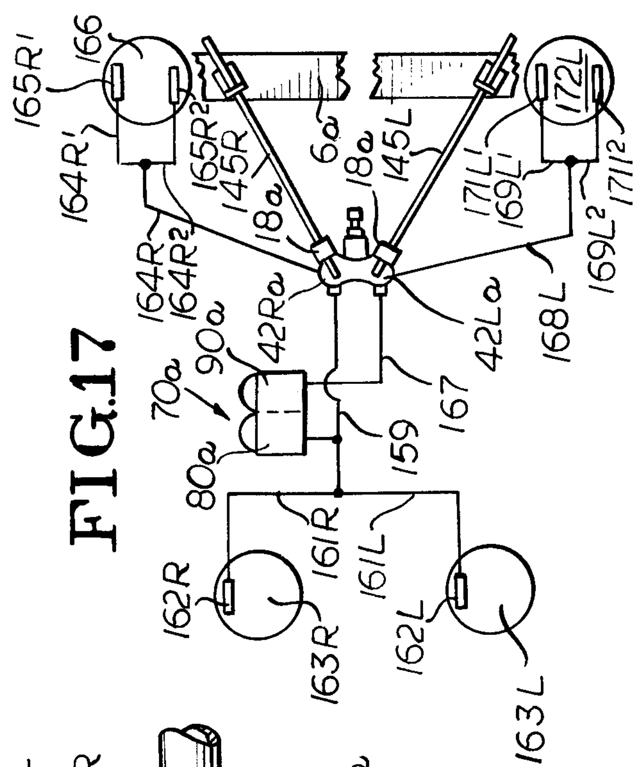

FIGS. 16 and 17 disclose two possible arrangements for interconnecting the independently operating valves with the vehicle wheels and the master cylinder. FIG. 16 shows an arrangement whereby the front chamber 80*a* of the master cylinder 70*a* is connected by a line 151 to branch lines 152L and 152R which are connected to single wheel cylinders 153L and 153R of the front wheel brakes 154L and 154R. Rear chamber 90*a* is connected by branch lines 155R and 155L to the inlets of the proportioning valves 42R*a* and 42L*a*, and the outlets of these valves are connected by lines 156R and 156L to the single wheel cylinders 157R and 157L of rear wheel brakes 158R and 158L.

In FIG. 17, the front chamber of the master cylinder 70*a* is connected by a line 159 to branch lines 161L and 161R, which are connected to front wheel cylinders 162L and 162R of the front wheel brakes 163L and 163R and also to the inlet of the proportioning valve 42R*a*. The outlet of valve 42R*a* is connected by a line 164R to the branch lines $\mathbf{164R^1}$ and $\mathbf{164R^2}$ which connect with wheel cylinders $\mathbf{165R^1}$ and $\mathbf{165R^2}$ respectively of the rear wheel brake assembly 166R.

The rear chamber 90*a* of the master cylinder is connected by a line 167 to the inlet off valve 42L*a* which has its outlet connected by a line 168L to branch lines $\mathbf{169L^1}$ and $\mathbf{169L^2}$ which, in turn, are connected to rear wheel cylinders $\mathbf{171L^1}$ and $\mathbf{171L^2}$ respectively of the rear wheel brake assembly 172L.

Specific forms of the invention have been disclosed but these are not intended to limit the invention, inasmuch as various forms will now become readily apparent to those skilled in the art. It is intended that the scope shall be only limited as set forth in the appended claims.

We claim:

1. In a braking system with a master cylinder having front and rear pressure chambers for a vehicle having sprung and unsprung masses, said unsprung mass comprising front and rear wheels and braking means therefore, brake pressure proportioning valve means in said system comprising a body with a plurality of parallel bores, each having inlet and outlet ports, means selectively connecting said inlet and outlet ports to certain of said chambers and with said front and rear braking means respectively, said valve body being mounted on one of said masses, a piston in each of said bores for proportioning braking pressures between inlet and outlet ports, and means for impressing a loading force upon said pistons operatively connected to said rear wheel braking means for loading said pistons in accordance with the weight supported by said rear wheels including an equalizer bridging all of said pistons and yieldable load means extending between said rear axle structure and said equalizer.

2. The invention according to claim 1, wherein said one of said chambers is connected to said front wheel braking means while the other said chamber is connected to said proportioning valve means and said rear wheel braking means.

3. The invention according to claim 1, wherein said means connecting said one of said chambers with the inlet port of at least one of said valves also connects said last mentioned chamber with said brake means of said front wheels.

4. The invention according to claim 3, including means interconnecting the other chamber with the inlet of another of said valve means, and said other valve means having its outlet port connected to the brake means of at least one of said rear wheels.

5. The invention according to claim 1, wherein said yieldable load means comprises a flexible rod, said valve means comprising a common housing, and pivot means on the housing, said rod fastened to said pivot means serving as a fulcrum for said rod.

6. The invention according to claim 1, wherein said plurality of valve means comprises a pair, and said means interconnecting said one chamber to said inlet port of at least one of said valve means interconnecting the same with the inlet ports of all of the valve means and means connecting the other of said chambers with said brake means of the front wheels.

7. The invention according to claim 6, wherein the outlet ports of both valve means connected to the brake means of both rear wheels.

8. The invention according to claim 1, wherein said rear exit ports are interconnected and connected to all of said rear wheel brake means.

9. In a braking system with a master cylinder having front and rear pressure chambers for a vehicle having sprung and unsprung masses, said unsprung mass comprising front and rear wheels and braking means therefor, brake pressure proportioning valve means in said system comprising a body with a plurality of parallel bores, each having inlet and outlet ports, one of said chambers being connected to said inlet ports, said braking means of the rear wheels having plural components, said outlet ports being selectively connected to different components of the braking means of the rear wheels at opposite sides of the vehicle, and the other of said chambers is connected to the braking means of the front wheels, said valve body being mounted on one of said masses, a piston in each of said bores for proportioning braking pressures between inlet and outlet ports, and means for impressing a loading force upon said pistons operatively connected to said rear wheel braking means for loading said pistons in accordance with the weight supported by said rear wheels.

10. In a braking system with a master cylinder having front and rear pressure chambers for a vehicle having sprung and unsprung masses, said unsprung mass comprising front and rear wheels and braking means therefor, brake pressure proportioning valve means in said system comprising a body with a plurality of parallel bores, each having inlet and outlet ports, one of said chambers being connected to one of said inlet ports and the other said chamber is connected to another of said inlet ports and to the braking means of the front wheels, the outlet of one valve is connected to the braking means of rear wheels on one side and the outlet of another valve is connected to the braking means of rear wheels on the other side, said valve body being mounted on one of said masses, a piston in each of said bores for proportioning braking pressures between inlet and outlet ports, and means for impressing a loading force upon said pistons operatively connected to said rear wheel braking means for loading said pistons in accordance with the weight supported by said rear wheels.

11. In a braking system with a master cylinder having front and rear pressure chambers for a vehicle having sprung and unsprung masses, said unsprung mass comprising front and rear wheels and braking means therefor, brake pressure proportioning valve means in said system comprising a body with a pair of valves having parallel bores, each valve having an inlet port and an outlet port, said valve body having a bore interconnecting said outlet ports, means shiftable in said last mentioned bore to indicate a pressure imbalance at said outlet ports of said pair of valves, means selectively connecting said inlet and outlet ports to certain of said chambers and with said front and rear braking means respectively, said valve body being mounted on one of said masses, a piston in each of said parallel bores for proportioning braking pressures between inlet and outlet ports, and means for impressing a loading force upon said pistons operatively connected to said rear wheel braking means for loading said pistons in accordance with the weight supported by said rear wheels.

12. The invention according to claim 11, wherein said shiftable means includes a reciprocable piston normally centered in said bore and having a central groove, defined by inclined surfaces, and a switch having a reciprocable nib communicating with said bore and normally positioned in said groove engaging said piston.

13. In a braking system with a master cylinder having front and rear pressure chambers for a vehicle having sprung and unsprung masses, said unsprung mass comprising front and rear wheels and braking means therefor, a rear axle structure for said rear wheels, brake pressure proportioning valve means in said system comprising a body with a pair of valves having parallel bores, each valve having inlet and outlet ports, means selectively connecting said inlet and outlet ports to certain of said chambers and with said front and rear braking means respectively, said valve body being mounted on one of said masses, a piston in each of said bores for proportioning braking pressures between inlet and outlet ports, and means for impressing a loading force upon said pistons operatively connected to said rear wheel braking means for loading said pistons in accordance with the weight supported by said rear wheels comprising a flexible rod for each valve extending between each end of said rear axle structure and its respective valve so that the loading on each side of the vehicle is independently compensated for by the valve means.

14. The invention according to claim 13, wherein said valve means comprises a common housing having a pair of parallel bores housing the pair of valves, and a pair of pivot means on the housing, each rod being fastened to one of the pivot means serving as a fulcrum for its respective rod.

15. The invention according to claim 14, wherein said piston of each valve has a slotted upper end adapted to receive one end of its respective flexible rod.

16. The invention according to claim 14, wherein said piston of each valve has a crowned upper end, and the one end of its respective flexible rod rests on said crowned end.

17. The invention according to claim 13, wherein one of said chambers is connected to both of the inlet ports, the outlet of one valve is connected to the braking means of rear wheels on one side, and the outlet of the other valve is connected to the braking means of rear wheels on the other side.

18. The invention according to claim 13, wherein one of said chambers is connected to one of said inlet ports and the other said chamber is connected to the other inlet port and to the braking means of the front wheels, the outlet of one valve is connected to the braking means of rear wheels on one side, and the outlet of the other valve is connected to the braking means of rear wheels on the other side.

19. In a braking system for a vehicle having sprung and unsprung masses, a braking pressure proportioning valve in said braking system including a housing mounted on one of said masses, a valve stem reciprocable in a bore in the housing and inlet and outlet ports communicating with said bore, means for setting said stem in accordance with the vehicle load, and comprising a spring rod connected to the other of said masses, means pivotally supporting said rod from said housing including a pin with an aperture admitting said rod therethrough, said rod abutting said stem, means releasably interconnecting said rod with said pin comprising a U-shaped element sleeved over the end of said rod and including a pair of legs embracing an end portion of said rod therebetween, a tang on one leg extending into a groove in said end portion, and means on said legs embracing said pin therebetween.

20. The invention according to claim 19, wherein said valve has another bore with inlet and outlet ports and a stem reciprocable in the bore, and equalizer means extending across all of the stems and in engagement with said end portion.

21. The invention according to claim 19, wherein said valve has another bore with inlet and outlet ports and a stem reciprocable in the bore, and a second spring rod abutting the last mentioned stem, the spring rods being connected to the opposite sides of the other of said masses.

22. The invention according to claim 21, wherein said other of said masses includes a vehicle axle, and said spring rods are connected at the opposite ends of the axle.

23. In a braking system for a vehicle having front and rear wheels and a body spring-supported therefrom and said wheels having disproportionate braking means, means for substantially equalizing the braking effect of all of said braking means in accordance with the loads carried in the body and comprising plural proportioning valve means in a common housing supported in the body, load sensing means connected between certain of the wheels and the valve means, and a master cylinder having pressure chamber means connected to the front wheel brake means and through said proportioning valve means with the brake means of the rear wheels, and means for regulating the effectiveness of said valve means with reference to each other and operatively controlled by said sensing means.

* * * * *